Feb. 10, 1931. L. T. PENNY 1,792,442
RAILWAY BRAKE OPERATING MECHANISM
Filed Feb. 4, 1929 3 Sheets-Sheet 2
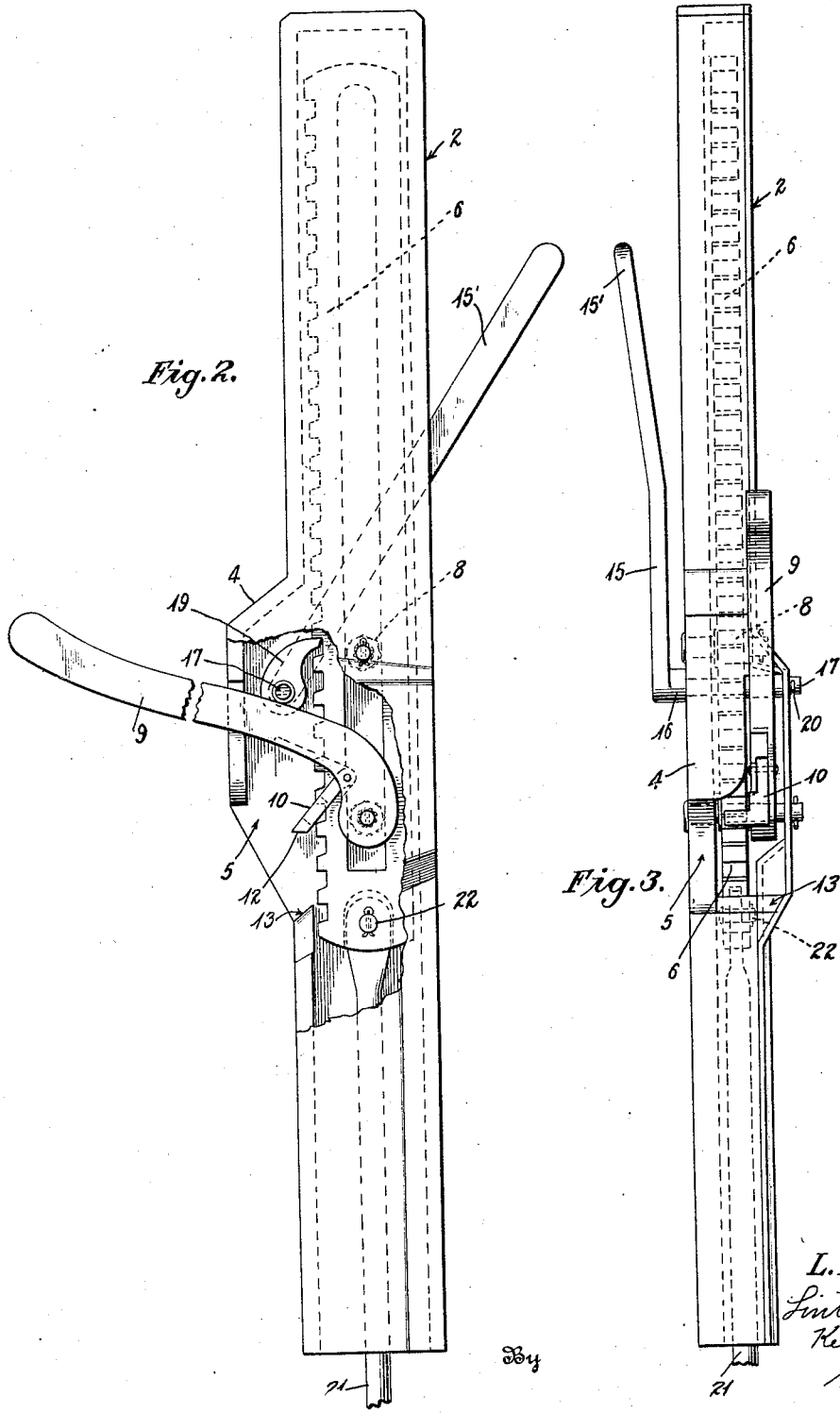

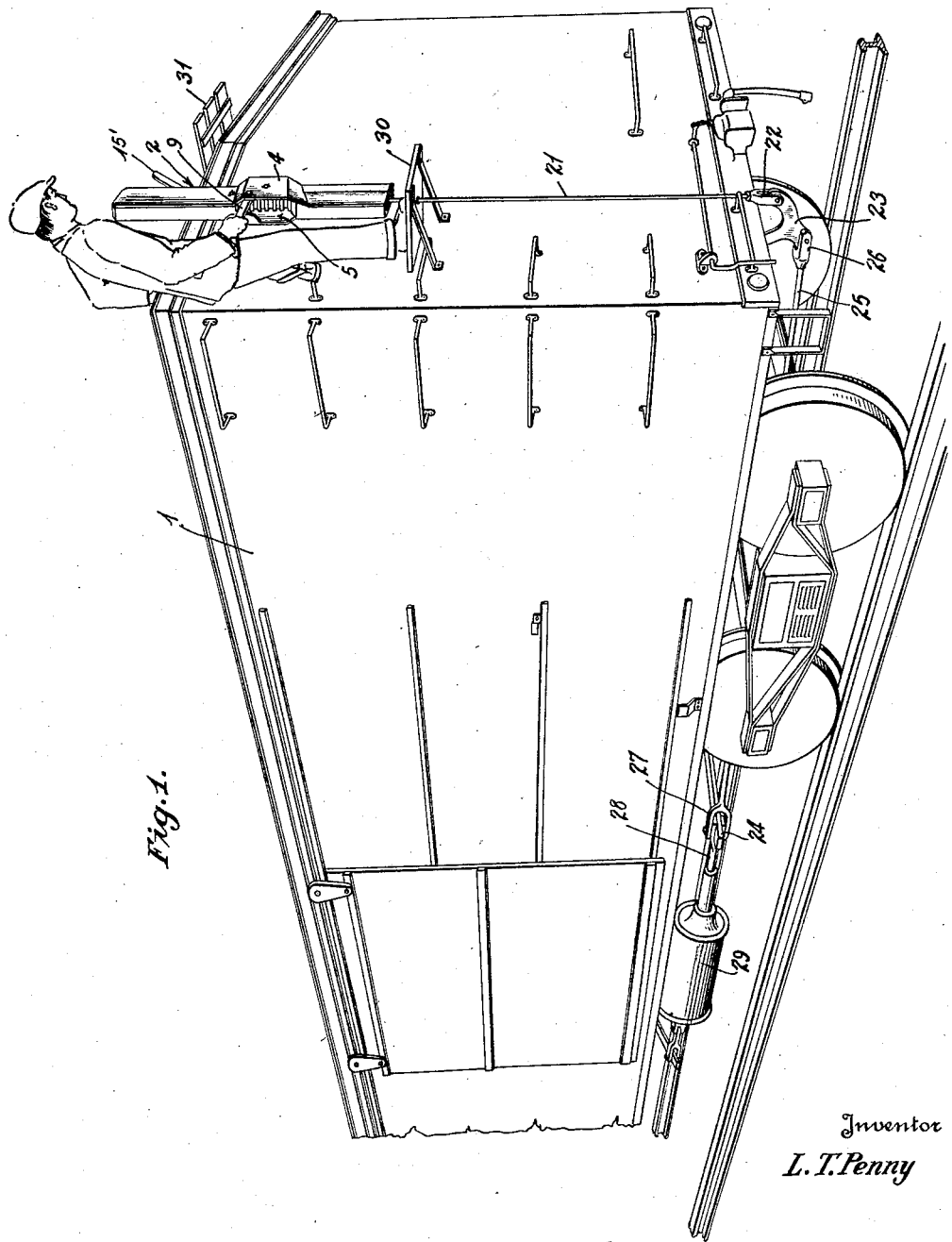

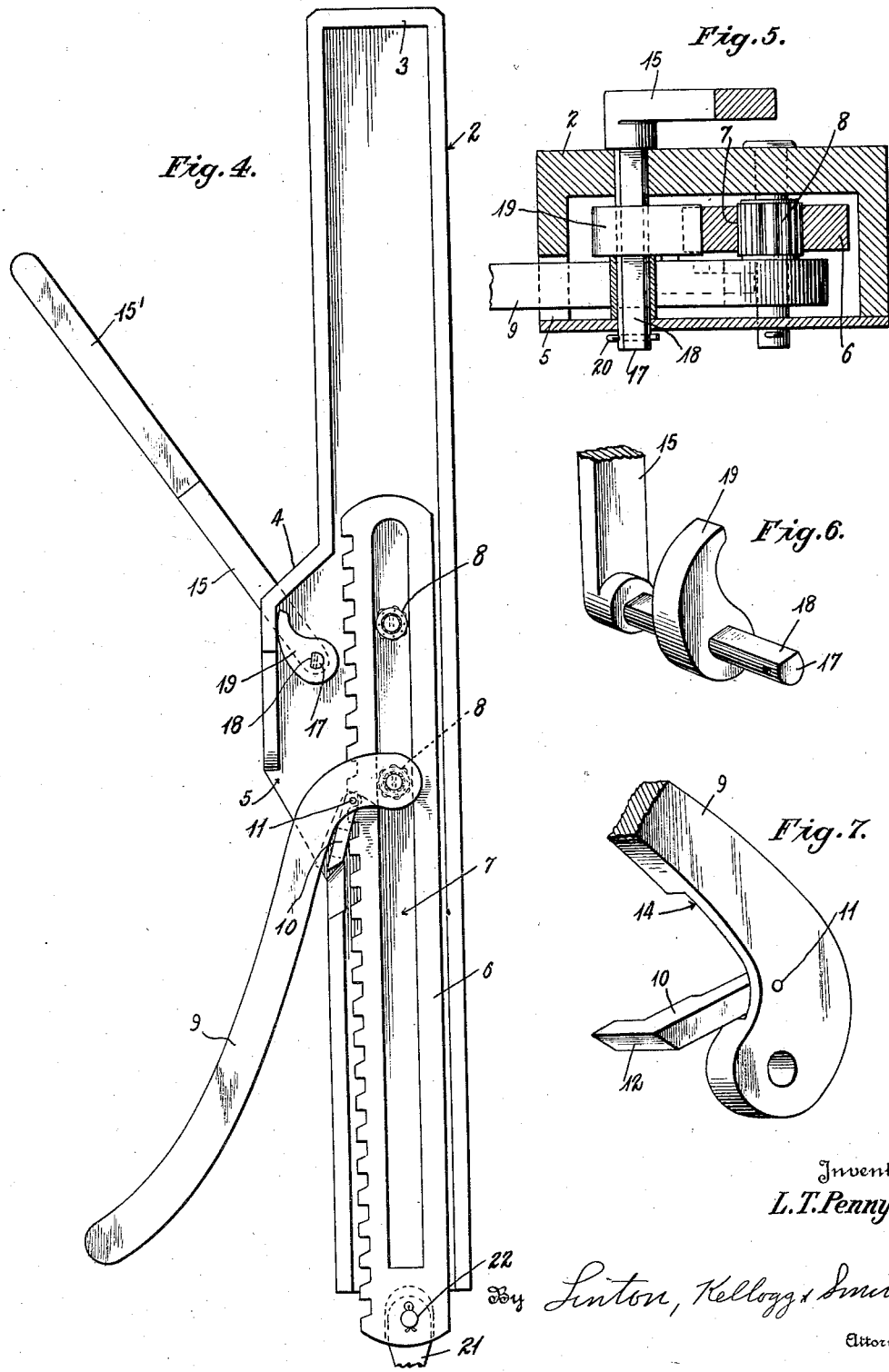

Patented Feb. 10, 1931

1,792,442

UNITED STATES PATENT OFFICE

LEON THOMAS PENNY, OF RALEIGH, NORTH CAROLINA

RAILWAY-BRAKE-OPERATING MECHANISM

Application filed February 4, 1929. Serial No. 337,354.

This invention relates to improvements in railway rolling stock brake operating mechanisms, having for an object to provide a mechanism of simple and dependable construction, which, when installed upon railway rolling stock, may be either manually or automatically operated for positively actuating the brakes thereof and which is capable of being effectually operated with a maximum degree of safety to an operator.

It is also an object of the invention to provide a brake operating mechanism, the construction of which is such as to render its operation, under all conditions (either climatic or mechanical), practical and positive, the same being without chains or like connections between the brake bar and the operating means proper, consequently, avoiding those difficulties and uncertainties attendant with the usage of brake chains, as for example, the dragging of the chains and catching in obstructions along a track bed or the kinking and binding of the chains during winding or unwinding of the same about the usual hand brake shaft, with the resultant inability upon the part of a brakeman to apply or release the rolling stock brakes without first correcting the difficulty, oftentimes, at grave risk to his safety.

Yet another and equally important object of the invention may be stated to provide a mechanism of the character mentioned so constructed as to permit the brakes of an equipped car to be set and positively retained in such position without additional effort upon part of an operator, means being provided for automatically engaging and releasably retaining the brake staff of the mechanism in an adjusted position during the application of car brakes therewith, such means, however, being readily and easily moved to a neutral position for releasing the brake staff or for preventing engagement of the same with the staff under certain operating conditions.

A still further object of the invention may be stated to reside in the provision of a brake operating mechanism which is exceedingly flexible in its mode or range of usage, permitting the setting of the brakes when either manually or automatically operated, as well as permitting the equipped brakes to be applied and released when manually or automatically operated, without locking or securing the same in their adjusted positions, this latter phase of operation being especially desirable and advantageous under those conditions where it is desirable to apply the brakes of the rolling stock for but brief durations and then, to release the same.

Other objects of the invention will be in part obvious and in part pointed out hereinafter.

In order that the invention and its mode of operation may be readily understood by persons skilled in the art, I have in the accompanying illustrative drawings, and in the detailed following description based thereon, set out several possible embodiments of the same.

In these drawings:

Figure 1 is a fragmentary perspective view of a freight car equipped with the improved brake operating mechanism;

Figure 2 is a detail in elevation, having parts thereof broken away, illustrating the construction of the brake staff operating means;

Figure 3 is a similar view taken at substantially right angles to the Figure 2;

Figure 4 is a side elevation of the brake staff operating means having one side of the casing thereof removed;

Figure 5 is an enlarged transverse section taken through the brake staff operating means;

Figure 6 is an enlarged fragmentary detail in perspective showing the mounting of the pawl for locking or releasably securing the rack bar of the brake staff in an adjusted or set position; and Figure 7 is an enlarged fragmentary detail in perspective illustrating the particular type of pawl mechanism employed in connection with the rack bar operating lever.

Having more particular reference to the drawings, in connection with which like characters of reference will designate corresponding parts throughout, I have shown for purposes of illustration herein, the invention as being installed upon a railway freight car indicated in its entirety by the numeral 1, the trucks of which are provided with the usual type of wheel brake mechanism adapted to be manually operated through the medium of the invention or to be automatically operated from the compressed air line of the car train.

The improved brake operating mechanism may be stated to comprise a vertically disposed casing, generally indicated by the numeral 2, which, as is shown in the Figure 1, is adapted to be fixedly mounted adjacent the upper portion of one end wall of the freight car 1, preferably, at an angle so that the inner side wall of said casing is substantially obliquely disposed with respect to the adjacent end wall of the car body. The upper end of this casing 2, which may be of cast metal, sheet metal, or other suitable construction, is closed, as indicated by the numeral 3, while the lower end thereof is open, for a purpose which will be subsequently apparent, and the intermediate portion of said casing is enlarged as indicated by the numeral 4 and provided with a way 5, through which an operating lever, hereinafter more fully described, is adapted to extend. If desired, one side wall of the casing or housing 2 may be removably secured to the body portion of the housing, whereby to permit access to the interior thereof for replacement or repairing of those working parts received thereby.

Slidably mounted within the vertically disposed casing 2 is a rack bar 6 having teeth formed upon that side of the same adjacent the way 5, while a slot 7 is formed longitudinally therein and receives therethrough roller bearing devices 8 mounted within said casing 2, preferably, adjacent the intermediate portion thereof, as is shown in the Figure 4. In this connection, it will be noted that the roller bearing devices 8 are in relatively spaced relation and consequently upon this, with sliding movement of the rack bar 6 in the casing 2, binding thereof with the resultant preventing of free sliding movement of said bar, will be prevented.

That the rack bar 6 may be moved longitudinally of the casing 2, I provide an operating lever or handle indicated by the numeral 9, pivotally mounting said lever within the intermediate portion of the casing 2, preferably, adjacent the mounting of the lowermost roller bearing device 8. The handle or free portion of this lever 9 is adapted to extend through the way 5 of the enlarged intermediate part 4 of the casing 2 so as to facilitate rocking thereof upon its pivot. A substantially right angularly formed pawl 10 is pivotally mounted upon the lever 9 adjacent the inner end of the same, as is indicated by the numeral 11 and this pawl is adapted, at times, to be engaged with the teeth of the rack bar 6 whereby to impart step-by-step sliding movement thereto upwardly or downwardly with respect to the casing 2. In this connection, it will be noted that the lower or free end of the pawl 10 is bevelled as indicated by the numeral 12 and this bevelled portion is adapted to engage with a correspondingly formed portion 13 of the adjacent end of one end wall of the casing 2, as is indicated in the Figure 4, that is, when the handle 9 is permitted to swing to its lowermost position. Thus, it will be seen that with the arrangement of the handle 9 in its lowermost position with respect to the casing 2, the pivotal pawl 10 will be caused to move outwardly with respect to the teeth of the rack bar 6 and consequently upon this, any and all interference with free sliding movement of said rack bar 6 from the pawl 10 will be prevented. Furthermore, to permit of this outward movement of the pawl 10 with respect to the teeth of the rack bar 6 when the lever 9 is in its lowermost position I preferably recess or cut away a portion of the inner part of the lever 9, as indicated by the numeral 14, thus, permitting the pawl to engage therein in the fashion as is shown in the Figure 4.

In order that the rack bar 6 may be, at times, secured in an adjusted position with respect to the casing 2 when operated from the lever 9 and the pawl 10, I provide a second lever or arm 15, off-setting the intermediate portion of said lever so that the handle part 15' thereof will be disposed away from the adjacent side wall of the casing 2 and thus will permit of its free movement without striking or engaging of the operator's hand with said casing. This lever 15 is formed upon one end, with an enlargement 16 fixedly carrying a supporting pin 17, one side of which is flattened as indicated at 18. Upon the pin 17, there is fixedly mounted a pawl 19, this pawl, as will be noted upon reference to the Figures 2 and 6, being arranged to extend coincidentally with the lever 15. In mounting the lever 15 with respect to the casing 2, the pin 17 carried upon the enlarged portion 16 thereof is rotatably received in bearing openings formed in the opposite side walls of the enlarged intermediate portion 4 of the casing 2 and a cotter pin 20 or other suitable locking device, is then passed through an opening formed in its free end, hence, preventing lateral displacement of said pin 17 and said lever 15 with respect to the casing 2. When so mounted in the intermediate portion 4 of the casing 2, it will be seen that the pawl 19 will be arranged adjacent to the tooth carrying side of the rack bar 6 and consequently, when the lever 15 is swung to that position as is shown in the Figure 2, said pawl 19 will have engagement with the rack bar teeth, though when said lever 15 is swung into that position as is shown in the Figure 4, it will be fully disengaged from the rack bar teeth and consequently, will have no effect upon free sliding movement of said rack bar with respect to the casing 2. Also, it will be noted in this connection, that with positioning of the lever 15 as is shown in the Figure 4, its extent of movement with respect to the casing 2 will be limited by engagement of the pawl 19 with the adjacent end wall of the enlarged portion 4.

A brake operating staff 21 is provided the operating mechanism and is adapted to be extended into pivotal engagement with the lower end of the rack bar 6, as is indicated by the numeral 22, the lower end of this staff, carrying a bifurcated fitting 22 which, in turn, is pivotally connected to an adjacent portion of a rocker arm 23 pivotally mounted in suitable bearings under the brake car body 1 and adjacent to that end wall of the same receiving the brake operating mechanism.

To permit of the transmission of braking movement to the usual brake bar 24 supported beneath the car body 1, I provide a connecting rod 25, pivoting one end of said rod as at 26 to another portion of the rocker arm 23 and similarly connecting the remaining or opposite end of said connecting rod to the brake bar 24, as at 27. Thus, it will be seen that with the imparting of longitudinal movement to the brake staff 21, that motion in turn will be transmitted through the rocker arm 23 to the connecting rod 25 for operating the brake bar 24. The direction in which the brake bar 24 is moved, of course, will depend upon the direction of movement of the brake staff 21.

It is desirable that the brake bar 24 shall be operated, at times, from the compressed air line of the train and to effect this, a piston rod 28 of the usual compressed air cylinder 29 employed in compressed air brake mechanisms and supported beneath the car body 1, as is shown in the Figure 1, is connected to the brake bar 24 adjacent the point of connection of the rod 25 therewith.

To facilitate operation of my improved brake operating mechanism, that is, whereby a brakeman or other person may effectually and safely operate the invention, I may and preferably do mount a support or platform 30 upon that end wall of the car body 1 adjacent to or receiving the casing 2, as is shown in the Figure 1. This platform will permit a brakeman or other operator to be supported in a position whereat the lever 9 may be conveniently and effectually operated and furthermore, whereby the pawl carrying lever 15 may be swung to either of its two positions, as desired. Also, in this connection, it will be noted that the casing 2 is so arranged that the same is obliquely disposed with respect to the adjacent end wall of the freight car body. Consequently upon this, a brakeman may arrange himself so as to stand between said end wall of the freight car body and the lever 9, thus, effect operation of said lever in a manner which will avoid the tendency to throw him from normal balance and from the supporting platform 30, also, to permit said brakeman to steady, secure or brace himself against portions of the car 1 after the fashion as is shown in the Figure 1.

I furthermore call attention to the fact that the casing 2 is so positioned with respect to the freight car end wall receiving it that the lever 15 may be conveniently reached from the car roof or walk-way 31 or from the platform 30. Thus, swinging of said lever 15 to either of its two positions, may be readily and conveniently effected from either the car top or the platform 30.

In operation of my improved brake operating mechanism, where the equipped car brakes are to be manually operated and are to be secured or set in their braked positions, the lever 15 carrying the pawl 19 is swung to that position as is shown in the Figure 2, whereupon said pawl 19 will engage with or between the adjacent teeth on the rack bar 6, said rack bar, under normal non-braking positions, being arranged in its lower position within the casing 2, as is shown in the Figure 4. With the pawl 19 engaging the teeth of the rack bar 6, the operator standing upon the platform 30, draws or pulls upwardly on the handle portion of the lever 9 and in so doing, causes the pivotally mounted pawl 10 to swing inwardly into engagement with an adjacent tooth upon said rack bar 6, thus moving the rack bar upwardly in the casing 2. As the rack bar moves upwardly under influence of the pawl 10 and the upwardly rocked lever 9, it will be seen that the pawl 19 will be successively engaged with the rack bar teeth and in so doing, will prevent movement of said rack bar in a reverse direction. The lever 9 is rocked back and forth until the rack bar 6 has been moved to a position within the casing 2 sufficient to impart longitudinal movement to the brake staff 21 sufficient to rock the arm 23 and transmit operating motion from the connecting rod 25 to the brake bar 24 for effectually applying the car brakes to the wheels thereof. Because of the engagement of the pawl 19 with the teeth of the rack bar 6, it will be seen that said rack bar 6 will be prevented from moving downwardly with respect to the casing 2 and therefore, that the adjusted or applied brakes of the freight car wheels will be maintained in their set positions. To release the brakes, it is only necessary that a brakesman swing the lever 15 from that position as is shown in the Figure 2 to the position illustrated in the Figure 4, whereupon the pawl 19 will disengage from the rack bar teeth and said rack bar will be permitted to freely move downwardly in the casing 2, hence, allowing the rocker arm 23 to return to its normal or inoperative position and also to release the car wheel brakes by return movement of the brake bar 24 to its normal or initial position.

Where it is desired to automatically apply the car brakes and to retain such brakes in their applied or set positions, subsequently to this automatic operation, the lever 15 carrying the pawl 19 is again moved to that position as is shown in the Figure 2. With the application of air to the piston working within the cylinder 29, the rod 28 will cause the brake bar 24 to be moved in a direction to effect application of the brakes to the car wheels. Simultaneously with this operating movement of the brake bar 24, motion will be transmitted through the connecting rod 25, the rocker arm 23 and the brake staff 21 to the rack bar 6, moving said rack bar upwardly in the casing 2, whereupon the pawl 19 will successively engage with the teeth thereof. When the limit of operating movement of the brake bar 24 under influence of the piston rod 28 is reached, return of the brake bar 24 to its released or neutral position will be prevented, inasmuch as the pawl 19 will be engaged with the teeth of the rack bar 6 and thus, will hold said rack bar in its adjusted position, consequently, retaining the car brakes in their set or applied positions. The brakes, however, may be instantly released by swinging the lever 15 to the position as is shown in the Figure 4, whereupon the pawl 19 will be disengaged from the teeth of the rack bar and said bar will be permitted to return to its lower or normal position within the casing 2, thereby, allowing return movement of the staff 21, the rocker arm 23, the connecting rod 25 and the brake bar 24 to their neutral and normal positions.

By reason of the provision of the lever 15 with the locking pawl 19 and the manner in which said pawl 19 engages with the teeth of the rack bar 6, it will be understood that the improved braking mechanism may be advantageously used for the so-called "tying down" of freight cars, that is, when the freight cars are moved into a yard or upon a siding and it is desired to apply the brakes and to leave them applied so as to prevent any further movement of the same with disconnection of the locomotive therefrom. This so-called "tying down" of the side-tracked cars may be either manually or automatically effected, that is, they may be "tied down" by individual operation of the brake operating mechanisms upon the various cars through the levers 9, or they may be "tied down" by operation of the compressed air line of the same from the locomotive, whereupon the brakes of the different cars will be secured in their applied or adjusted relation by engagement of the pawls 19 with their respective rack bars 6 of the different mechanisms.

Under certain operating conditions, it is desirable that the rack bar 6 of the improved brake operating mechanism shall be permitted of free movement within the casing 2 without interference from or engagement by the pawl 19 of the lever 15. For instance, when freight cars are being "drifted," it is usual that a brakeman will manually apply the brake of the drifting car so as to regulate the speed at which the same travels and finally, to bring the same to a stop. With the "drifting" of an equipped freight car, it will be seen that a varying braking action may be applied to the car's front wheels by rocking the lever 9 either upwardly or downwardly, thereby causing the rack bar 6 to be moved upwardly or downwardly due to connection of the pivotal pawl 10 therewith. That is, the speed of the "drifting" car may be regulated to the desired nicety by either drawing or pulling upwardly upon the lever 9 to break its momentum or permitting said lever 9 to be swung downwardly, whereby to release the car brakes and permit desired movement of the car. When, however, the car has been brought to a stand, the brakes of the same may be secured in their set or applied position, by swinging the lever 15 with its locking pawl 19 into engaged position with respect to the teeth of the rack bar 6, hence, securing the rack bar 6 in its previously adjusted position within the casing 2. Furthermore, it will be understood that the brake operating mechanisms may be similarly operated through the compressed air line of a train and from the train locomotive, that is, the levers 15 and their respective pawls 19 of the braking mechanisms of the different cars may be arranged in disengaged positions and by operation of the compressed air control within the locomotive cab, the car brakes may be applied and released with respect to the wheels of the different cars, at will of the operator.

Because of the housing of the operating or active parts of my improved brake operating mechanisms within the casings 2, it will be understood that such parts will be prevented from becoming coated with ice or similar formations and furthermore, will be prevented from becoming clogged with various débris, hence, ensuring proper and effectual operation of the devices, at all times.

Manifestly, the construction shown is capable of considerable modification, and such modification as is within the scope of my claims I consider within the spirit of my invention.

I claim:—

1. Mechanism of the character described, comprising a casing having an open lower end, the intermediate portion of said casing being enlarged and having a way formed in one side thereof, a rack bar received within the casing and movable longitudinally of the same, said rack bar being formed substantially throughout its length with a longitudinally disposed slot, roller bearings mounted within the casing and engaged in said slot of the rack bar, a hand lever mounted within the casing adjacent the enlarged intermediate portion thereof and having a portion of the same extended through said way in the side of the enlarged intermediate portion of the casing, a pawl pivotally mounted upon the inner portion of said hand lever and engageable with the teeth of said rack bar for facilitating the transmission of motion to said bar in one direction, another lever pivotally mounted upon the enlarged intermediate portion of said casing, a pawl fixedly carried by said last mentioned lever and arranged within the casing adjacent the intermediate enlarged portion of the same, said second mentioned pawl being adapted to be engaged, at times, with the teeth of said rack bar, for securing said bar against movement in a direction reverse to that in which the same is moved by said hand lever and said first mentioned pawl.

2. A mechanism for manually operating the brake mechanism of a railway car, comprising a casing secured to one end of a car, and having an open lower end, the intermediate portion of said casing being enlarged and having a way formed in one side thereof, a rack bar received within the casing and movable longitudinally of the same, said rack bar being formed substantially throughout its length with a longitudinally disposed slot, roller bearings mounted within the casing and engaged in said slot of the rack bar, a hand lever mounted within the casing adjacent the enlarged intermediate portion thereof and having a portion of the same extended through said way in the side of the enlarged intermediate portion of the casing, a pawl pivotally mounted upon the inner portion of said hand lever and engageable with the teeth of said rack bar for facilitating the transmission of motion to said bar in one direction, another lever pivotally mounted upon the enlarged intermediate portion of said casing, a pawl fixedly carried by said last mentioned lever and arranged within the casing adjacent the intermediate enlarged portion of the same, said second mentioned pawl being adapted to be engaged, at times, with the teeth of said rack bar, for securing said bar against movement in a direction reverse to that in which the same is moved by said hand lever and said first mentioned pawl, a pull rod having its upper end connected to the lower end of said slotted rack bar for operating a brake mechanism.

In witness whereof I have hereunto set my hand.

LEON THOMAS PENNY.